May 4, 1954  A. M. CASTELLO  2,677,517
MOVABLE OBJECT SUPPORT
Filed Aug. 31, 1951  4 Sheets-Sheet 2
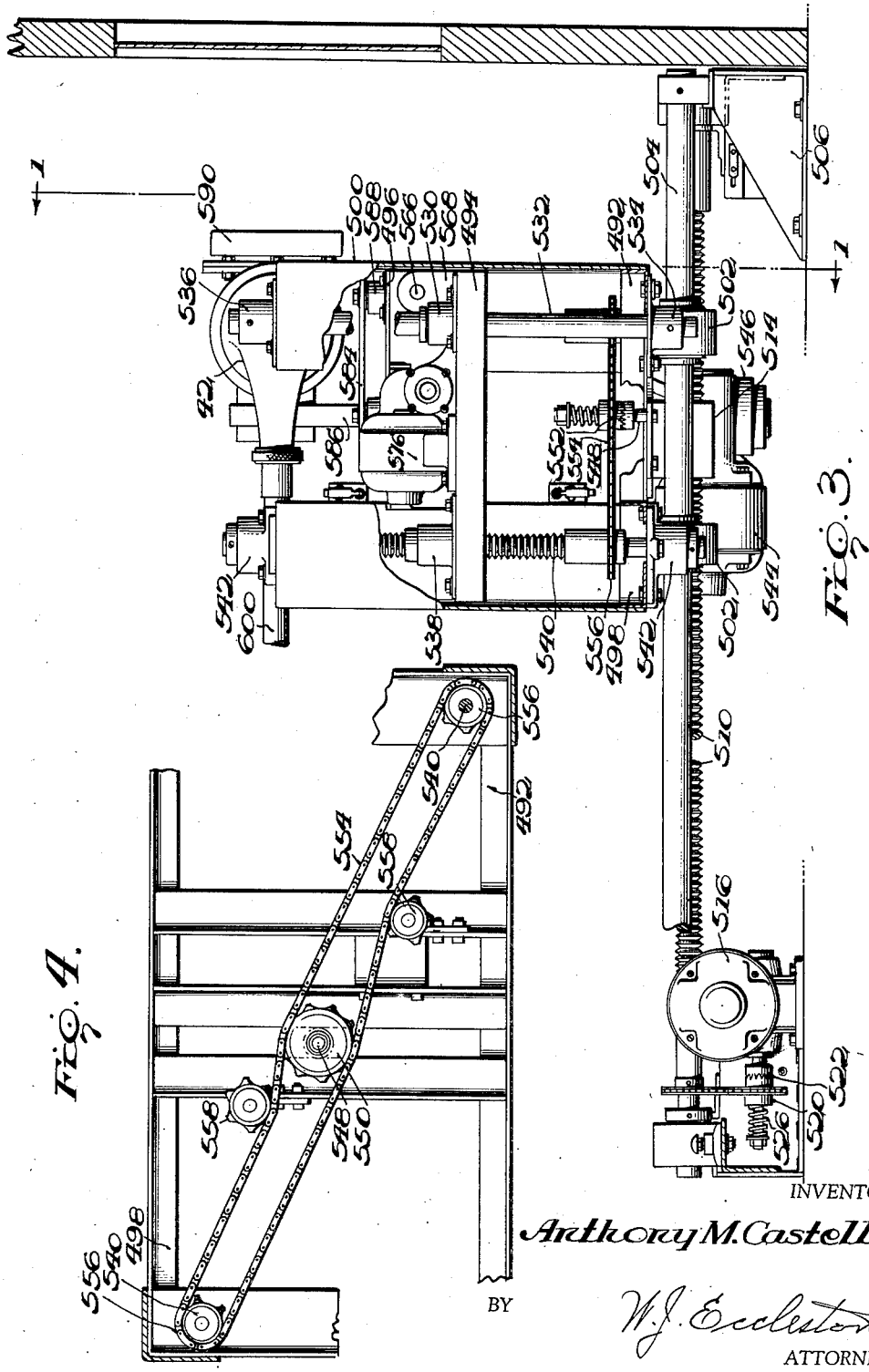
INVENTOR
Anthony M. Castello
BY
W.J. Eccleston
ATTORNEY

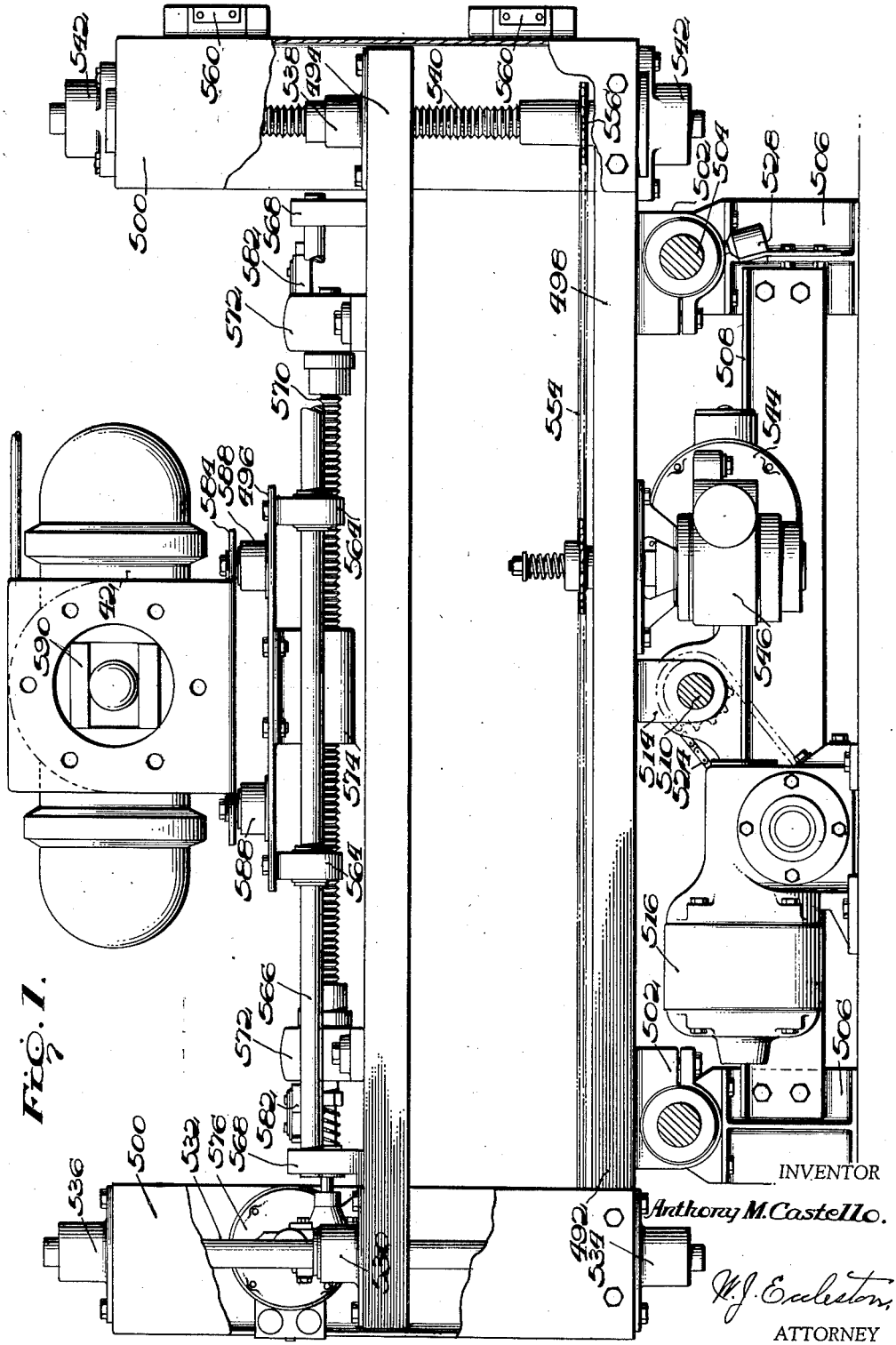

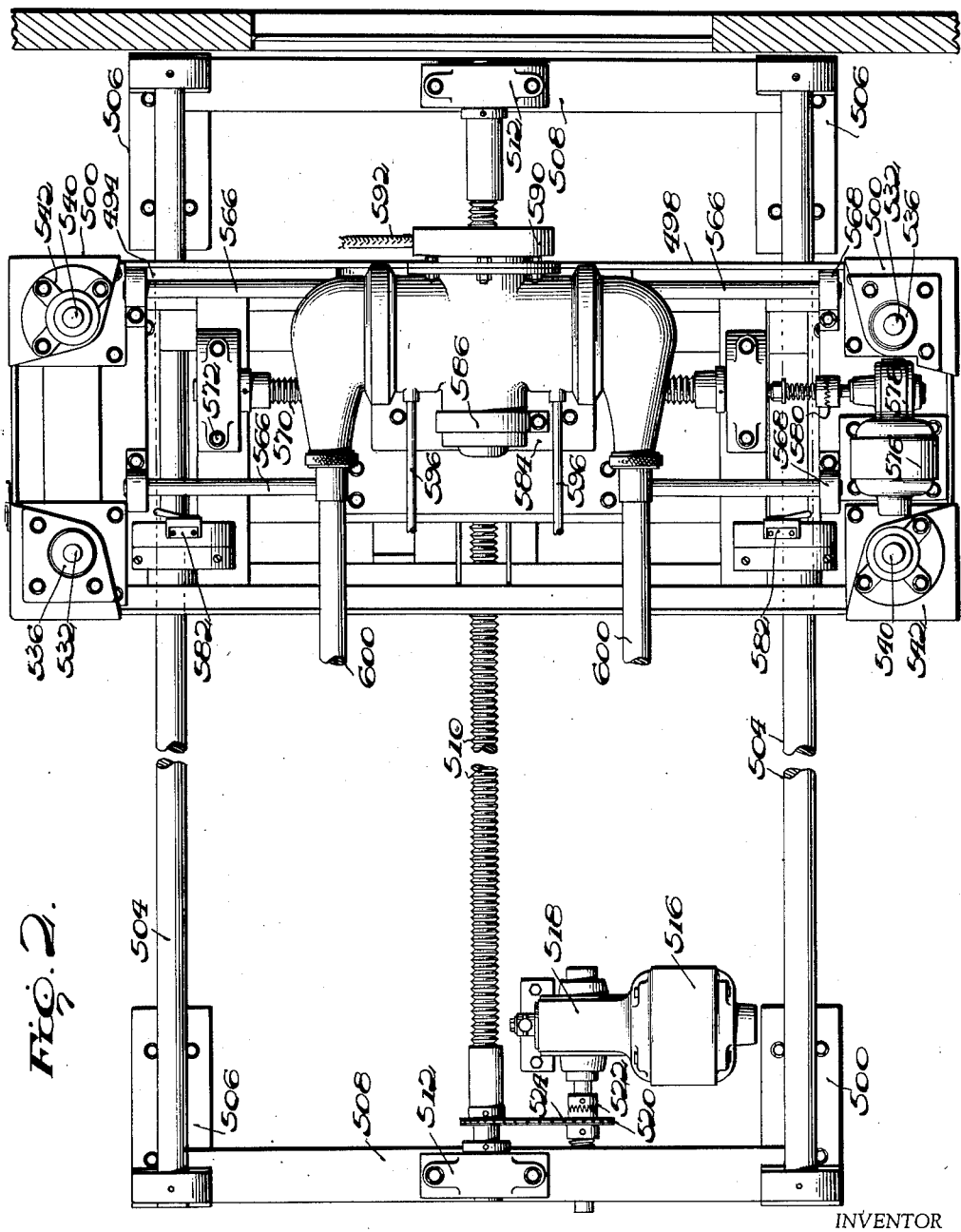

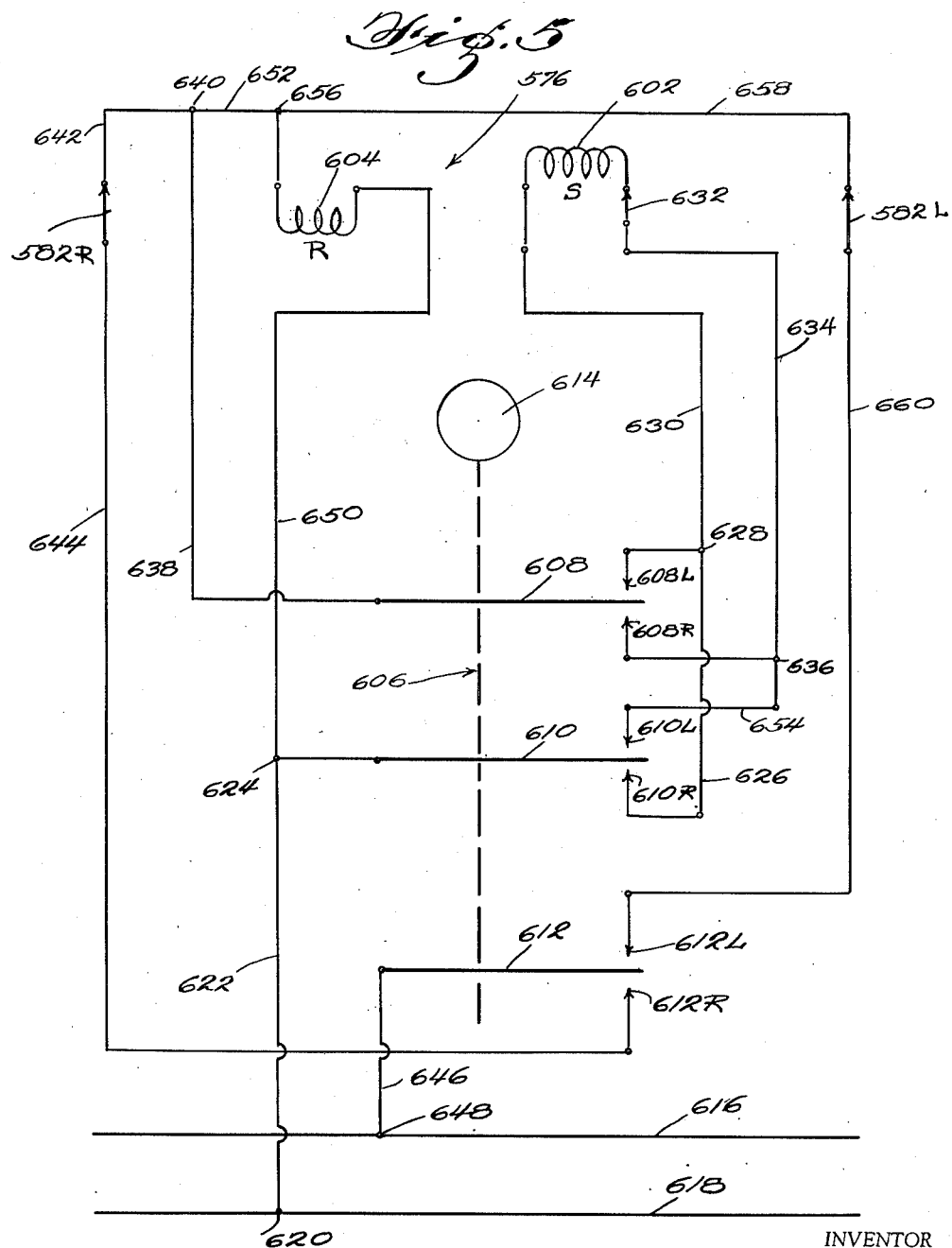

Patented May 4, 1954

2,677,517

UNITED STATES PATENT OFFICE 2,677,517

MOVABLE OBJECT SUPPORT

Anthony M. Castello, Washington, D. C.

Application August 31, 1951, Serial No. 244,681

15 Claims. (Cl. 248—124)

(Granted under Title 35, U. S. Code (1952), sec. 266)

The invention described herein, if patented, may be manufactured and used by or for the Government for governmental purposes, without the payment to me of any royalty thereon.

The present invention relates to movable supports or mounts and, more particularly, to a mount that is adjustable in a plurality of perpendicular directions.

While the device of the present invention is susceptible to many uses, it is designed particularly for use in installations at which it is desired accurately to move a supported object or device in a plurality of perpendicular directions under the control of an operator at a location relatively remote from the device. One example of a practical installation of the support of the present invention is to be found in the apparatus disclosed in the application for United States Letters Patent Serial No. 244,247 filed on August 29, 1951, by Albert Wiebe and entitled X-Ray Inspection Apparatus. In this apparatus the device of the present invention is used to support an X-ray tube which is to be moved transversely, vertically and in a fore and aft direction relative to a stationary fluorescent screen. Since the X-ray tube and its mount must be located on the opposite side of an X-ray impervious barrier from that on which an operator is stationed, the tube mount must be adjustable from a position relatively remote from its own location. The mount of the present invention is particularly adaptable for use in this environment, but it is to be understood that it is not limited to such use.

Although devices for moving a supported object in more than one direction are known, these devices are not readily adaptable for use in the X-ray inspection apparatus disclosed in the aforementioned application for patent because they are not readily remotely controlled nor do they have other refinements in construction necessary to a mount which is to be more or less blindly operated. Accordingly, an object of the invention is to provide a new and improved mount to support an object for adjustment in a plurality of normal directions.

Another object of the invention is to provide a new and improved mount including an object supporting platform movable in a plurality of normal directions by power operated means which may be remotely controlled.

A further object of the invention is to provide a new and improved mount as set forth in the preceding object which includes automatically operable controls to prevent overrun of the movable parts of the device in any of the directions that these parts are movable.

A more specific object of the invention is to provide a new and improved mount comprising a plurality of cradles including an object supporting cradle and cooperating guideways and guide structure on the cradles to support the same for relative reciprocable movement effective to move the object supporting cradle vertically and in normal directions horizontally.

A more general object of the invention is to provide a new and improved power operated movable object supporting mount which is relatively simple, sturdy and inexpensive in construction but which, nevertheless, is reliable in use and not subject to rapid wear or frequent malfunctioning.

These and other objects, advantages and capabilities of the invention will become apparent from the following description wherein reference is had to the accompanying drawing in which:

Figure 1 is a front elevational view taken in the direction of the arrows on the line I—I of Figure 3 showing the improved mount of the present invention with portions thereof broken away more clearly to disclose the structure of the present invention.

Figure 2 is a top plan view of the improved mount of the present invention;

Figure 3 is a side elevational view partly in section of the mount of the present invention;

Figure 4 is a fragmentary top plan view showing the drive for part of the mount of the present invention, and Figure 5 is a schematic wiring diagram of the control system for the improved object supporting mount of the present invention.

Referring to Fig. 1, it will be seen that the improved object support comprises a base cradle or support 492 reciprocably movable in a horizontal plane, a vertically movable intermediate cradle 494 which carries a platform cradle 496 reciprocably movable in a horizontal plane in a direction normal to the direction of movement of base cradle 492. The base cradle 492 comprises a generally rectangular frame 498 (Fig. 2) consisting of suitably interconnected longitudinal and transverse angle irons. From the corners of this frame rise angle shaped columns 500 (Fig. 1) which are rigidly attached at their lower ends to the corners of the base frame 498. Collars 502 are fixed to the underside of the base frame 498 adjacent its forward and rear edges spaced outwardly from the transverse centerline of the cradle. These collars are slidably engageable upon parallel guide rods 504 rigidly secured adjacent their opposite ends in opposed pedestals or standards 506 spaced by angle iron cross pieces 508 and anchored to the suitable fixed supporting structure.

The mechanism for moving the base cradle 492 along the guide rods 504 comprises a feed screw 510 (Fig. 2) parallel to the guide rods 504 and rotatably supported adjacent opposite ends in suitable bearings 512 mounted on the cross pieces 508 midway between the guide rods 504. A threaded feed nut 514 (Figs. 1 and 3) fixed to the underside of base frame 498 adjacent its center has threaded engagement with the feed screw 510 so that movement of the base cradle along the guide rods 504 may be effected by turning the feed screw.

Feed screw 510 is turned in opposite directions by a small reversible motor 516 (Fig. 2) which drives a speed reducer 518 having an output shaft upon which a pinion 520 is loosely mounted. This pinion is drivingly connected to the output shaft by a load limit clutch 522. Fixed upon feed screw 510 adjacent its rear end is a pinion which is driven from the speed reducer pinion 520 by a chain 524 passing over both.

The teeth on the driving and driven elements of the clutch 522 are of complementary generally triangular shape and are yieldingly held in driving engagement by a spring 526 (Fig. 3) so that they are adapted to slip when resistance of the driven element of the clutch to turning exceeds a predetermined maximum torque. Damage to the motor 516 is thus prevented should any part of the mount or base support 492 strike an obstruction while it is being moved along guide rods 504, and the operator will be apprised of this fact by the chatter of the slipping clutch elements.

In order automatically to discontinue operation of the drive motor 516 immediately before the base cradle 492 strikes either end of the guideway formed by guide rods 504, a pair of limit switches is provided in the energizing circuit for reversible motor 516. One of these switches automatically discontinues operation of this motor when the base cradle 492 arrives at one end of the guide rods 504 while the other discontinues operation of the motor in the opposite direction as the base cradle arrives at its other limit of movement. One of these limit switches is shown at 528 in Fig. 1. As there indicated this switch is bolted to a part of the right-hand rear standard 506 so as to be engaged by the rear right-hand collar 502 as the frame 492 approaches the rear end of the guideway. A similar switch (not shown) may be similarly mounted on the forward standard.

Like the base frame 492 the vertically movable intermediate frame 494 is of rectangular shape and is made from suitable longitudinal and transverse structural irons suitably interconnected. At diagonally opposite corners this frame is provided with vertically disposed collars one of which is shown at 530 in Fig. 3. These collars are freely slidable upon vertical guide rods 532 fixedly secured in diagonally opposite corners of the base frame 492 corresponding in location to the diagonally opposite corners at which guides 530 are mounted on the intermediate frame 494. The opposite ends of these guide rods are fixed in sockets 534 and 536 mounted respectively on the underside of base frame 492 and the upper end of the columns 500 located at the aforesaid diagonally opposite positions.

Threaded sleeves or feed nuts 538 are secured in the diagonally opposite corners of the intermediate frame 494 not occupied by guide sleeves 530, in other words, in the diagonally opposite corners of frame 494 complementary to those occupied by guide sleeve 530. These feed nuts 538 have threaded engagement with vertically extending feed screws 540 mounted in suitable vertically opposed bearings 542 secured in the base frame 498 and upper ends of those columns 500 at the diagonally opposite positions complementary to the positions occupied by the upper and lower collars 534 and 536, respectively. Feed screws 540 are rotated in opposite directions by a reversible electric motor 544 (Fig. 3) of suitable size mounted on the underside of base frame 492. This motor drives a speed reducer 546 which has an output shaft 548 that projects upwardly from the plane of the base frame 492. A pinion 550 (Fig. 4) loosely received upon this output shaft is drivingly connected to it by a load limit clutch 552 (Fig. 3) similar to the clutch 522 previously described.

Pinion 550 drives a sprocket chain 554 (Fig. 4) which is drivingly engaged over pinions 556 fixed to the feed screws 540 adjacent their lower ends. This chain is held in driving engagement with the opposite sides of drive sprocket 550 by a pair of idlers 558 freely rotatable upon vertically extending studs suitably secured to the base frame 498 on opposite sides of drive sprocket 550.

Operation of the motor 544 which effects movement of the intermediate frame 494 is arrested as the frame approaches either the upper or the lower ends of the guide rods 532 by upper and lower limit switches 560 (Fig. 1) fixed to the outside of one of the columns 500 adjacent the upper and lower ends thereof. As the intermediate frame 494 approaches either the lower or the upper ends of guide rods 532 the movable contact on one or the other of these switches is engaged by a fixed part of this frame thus opening the switch which has been engaged and the motor energizing circuit controlled by that switch so as to prevent continued operation of motor 544 in the one direction while not interfering with its operation in another direction as will be explained in the description of the control system for the various motors.

The third or platform cradle 496 (Fig. 1) may for example comprise a generally rectangular metal plate which has guide collars fixedly secured to its underside adjacent each of the corners thereof. The two front collars are shown at 564 in Fig. 1. These collars are slidable upon guide rods 566 (Fig. 2) extending lengthwise of the intermediate frame 494 and fixedly supported adjacent their opposite ends in standards 568 mounted on the topside of intermediate frame 494 adjacent its corners.

Platform 496 is moved along the guide rods 566 by a feed screw 570 (Fig. 1) rotatably mounted adjacent its opposite ends in suitable bearings 572 on the topside of intermediate frame 494 adjacent its opposite ends between and parallel to the guide rods 566. This feed screw has threaded engagement with a feed nut 574 fixed upon the underside of platform 496 adjacent its mid-point.

Feed screw 570 is driven in opposite directions by a reversible electric motor 576 (Fig. 2) of suitable size through a speed reducer 578 and a load limit jaw clutch 580. This clutch is similar to the clutch 522 previously described so as to slip if movement of the platform 496 is impeded. Limits to the sidewise movement of platform 496 under the influence of motor 576 are determined by limit switches 582 (Fig. 2) mounted on the topside of intermediate frame 494 adjacent its opposite ends so that the movable contacts thereof are engaged by the platform 496 as it approaches one or the other of its limits of sidewise movement.

For the purpose of illustration, an X-ray tube 42 is shown supported upon the platform 496. This tube has a sheet metal base plate 584 (Fig. 1) fixed adjacent its opposite corners to resilient shock mounts 588 secured on the topside of the platform 496. Suitable bracing such as a bracket 586 (Figs. 2 and 3) is provided to steady the tube 42. Fixed to the front side of the housing for this X-ray tube to control the emission of X-rays is a shutter 590 (Fig. 1) operated by a control cable shown fragmentarily at 592. Since the X-ray tube 42 is of the relatively high power industrial type, it is cooled by circulating oil between the same and a suitable cooler (not shown) through conduits fragmentarily shown at 596 (Fig. 2). Current is supplied to the tube through armored cables which are fragmentarily shown at 600.

As previously explained the mechanisms for effecting movement of the three cradles or supports 492, 494 and 496 are driven by separate motors 516, 544 and 576, respectively. In order to provide for selective adjustment of the position of the object supported on the top cradle or platform support 496, a manually operable drum or reversing switch is provided in the energizing circuit of the motors in addition to the limit switches 528, 560 and 582, respectively, previously mentioned. Since the same type of circuit may be used for controlling operation of each of the motors 516, 544 and 576, only the circuit for the motor 576 which moves the top cradle or platform 496 from left to right as viewed in Fig. 1 has been shown in Fig. 5. Motor 576 which is diagrammatically shown in this view has a starting winding 602 and a running winding 604. As previously explained, the limits of right and left-hand movement of platform 496 are controlled by the oppositely located limit switches 582. These switches are diagrammatically shown in Fig. 5 where the switch for limiting movement of platform 496 to the right is shown at 582R and that for limiting movement of this platform to the left is numbered 582L. Also diagrammatically shown in this view is a manually operable triple pole reversing switch 606 which has three movable blades numbered 608, 610 and 612. These blades are ganged together so as to operate in unison when an operating knob 614 on this switch is operated. Thus when this operating knob is moved in one direction the switch blades 608, 610 and 612 engage fixed contacts 608L, 610L and 612L. Movement of the knob 614 in the opposite direction moves the switch blades into contact with fixed contacts 608R, 610R and 612R. Current is supplied to the circuit from a source through the lines 616 and 618.

In Fig. 5 the control circuit is shown in neutral or inoperative position. The reversing switch blades 608, 610 and 612 are out of contact with their respective fixed contacts and, since it is assumed that this view shows the circuit when the platform 496 is at a position intermediate its limits of movement, limit switches 582R and 582L are closed. The platform therefore may be moved either to the left or right (Fig. 1) depending on the direction the reversing switch 606 is operated.

Assuming it is desired to move the top cradle or platform 496 to the right, the knob 614 on reversing switch 606 is pressed downwardly thus closing the circuits described below to the lines 616 and 618. Firstly, a circuit to the starting winding 602 of the motor 576 is completed through a junction 620, a conductor 622, a junction 624, movable switch blade 610, fixed switch contact 610R, a conductor 626, a junction 628, and a conductor 630 to one side of starting winding 602. The other side of this winding is connected to the line 616 through a centrifugal switch 632, a conductor 634, a junction 636, fixed switch contact 608R, movable switch blade 608, a conductor 638, a junction 640, a conductor 642, limit switch 582R, a conductor 644, fixed switch contacts 612R, movable switch blade 612, and a conductor 646, which is connected to the line 616 at a junction 648.

A circuit to the running winding 604 of the motor 576 is simultaneously closed through junction 620, conductor 622, junction 624, and a conductor 650, which is connected to one side of winding 604. The other side of this winding is connected to the source of supply of current through a junction 656, a conductor 652, junction 640, conductor 642, limit switch 582R, conductor 644, fixed switch contact 612R, movable switch blade 612, conductor 646, and the junction 648, which connects the latter conductor to the line 616. After the motor 576 attains speed the starting winding 602 is de-energized by operation of the centrifugal switch 632. Nevertheless the motor continues to operate until the reversing switch 606 is returned to neutral position or until the carriage 496 is moved far enough to the right to open right limit switch 582R. Since the circuit for both the starting and running windings of the motor 576 pass through this limit switch, it will be impossible to energize the motor 576 for operation in a direction to move the carriage 496 further to the right while limit switch 582R is open.

However, if the reversing switch 606 is shifted in the opposite direction, i. e., upwardly as seen in Fig. 5, a circuit for motor 576 running in the opposite direction through the starting winding 602 is completed so that the motor 576 will be operated in a direction to effect leftward movement of the platform 496. This circuit includes junction 620, conductor 622, junction 624, movable switch blade 610, fixed switch contact 610L, a conductor 654, junction 636, conductor 634, and centrifugal switch 632 to one side of the winding 602. The other side of this winding is connected to the line 616 through conductor 630, junction 628, fixed switch contact 608L, movable switch contact 608, conductor 638, junction 640, conductor 652, junction 656, a conductor 658, limit switch 582L, a conductor 660, fixed switch contact 612L, movable switch contact 612, and conductor 646 to the junction 648.

A circuit to the running winding 604 of motor 576 is simultaneously closed through junction 620, conductor 622, junction 624, and conductor 650, which is connected to one side of the winding 604, while the other side of this winding is connected to the line 616 through junction 656, conductor 658, limit switch 582L, conductor 660, fixed switch contact 612L, movable reversing switch contact 612, conductor 646, and junction 648. The motor 576 will therefore continue to run after the centrifugal switch 632 opens and breaks the circuit to the starting winding 602. However, once the limit switch 582L is opened by leftward movement of the platform 496, the motor 576 cannot be energized to operate in a direction to move the platform 496 further to the left because the energizing circuits for operating the motor 576 in a direction to produce leftward movement of platform 496 both pass through limit switch 582L. Nevertheless, since right limit switch 582R is then closed the motor 576 may be energized for operation in a direction to move the platform 496 to the right.

It will be observed therefore that limit switches 582L and 582R are effective to prevent energization of the motor 576 in one direction only respectively but do not interfere with its operation in the other direction. An automatic means is therefore provided to prevent overrun of the platform 496 either to the left or right. Circuits similar to that just described are also provided for the motor 516 which moves the base support 492, and the motor 544 which moves the intermediate support 494. These circuits are connected to the lines 616 and 618 at points spaced from the circuit shown in Fig. 5 but otherwise are exact duplicates of the circuit shown in this view and therefore need not be described.

Inasmuch as the intermediate platform 494 is carried by the base support 492 and carries the upper platform 496, it will be apparent that the latter will be moved in a forward or rearward direction as seen in Fig. 3 whenever the base support 492 is moved forwardly or rearwardly and that the upper platform will be raised or lowered whenever the intermediate cradle 494 is raised or lowered. Thus, by the control which an operator has over motors 516, 544 and 576 through the reversing switches therefor he is enabled selectively and accurately to move the platform 496 vertically and in normal directions horizontally to the exact location desired.

Since movement of the cradles 492 and 494 is controlled by manually operable reversing switches similar to the switch 606 which controls movement of cradle 496, the device of the present invention may be remotely controlled because these switches may be situated at any convenient location close to or remote from the movable mount. Control of the movable mount is also made more feasible due to the presence of the load limit clutches 522, 552, and 580 in the drive from the motors 516, 544 and 576, respectively to the feed screws operated by these motors. These clutches prevent damage to the motors should the respective platforms driven thereby be accidentally obstructed, and furthermore, in the latter event, an audible warning will be given to an operator by the chattering of the slipping clutch teeth.

While a preferred embodiment of the invention has been shown and described, it will be apparent that numerous variations and modifications thereof may be made without departing from the underlying principles of the invention. It is desired, therefore, by the following claims, to include within the scope of the invention, all such variations and modifications by which substantially the results of the invention may be obtained through the use of substantially the same or equivalent means.

I claim:

1. A movable mount comprising a plurality of cradles movable relatively along normally related axes, reversely operable drive means individual to said cradles for moving the same in opposite directions along the respective axes of movement thereof, power means individual to said individual drive means for reversely driving the latter, manually operable means effective selectively to control the direction of operation of said power means, means to limit the force which may be applied by said power means to said drive means, and automatically operable means to determine the limits to which said cradles may be driven under the control of said manually operable means.

2. A movable mount comprising a plurality of cradles including an object supporting cradle, cooperating guideways and guide structure to support said cradles for relative movement effective reciprocably to move the object supported by said mount in a plurality of normally related directions, reversely operable means including power means for driving said cradles in opposite directions upon the respective guideways thereof, manually operable means selectively to control the direction in which power for moving said cradles is applied to the latter for thereby controlling the direction the said cradles are moved, and means operable automatically to establish the limits to which said cradles are movable under the control of said manually operable means.

3. A movable mount comprising a plurality of cradles including an object supporting cradle, cooperating guideways and guide structure to support said cradles for relative movement effective reciprocably to move the object supported by said mount in a plurality of normally related directions, reversely operable means including power means for driving said cradles in opposite directions upon the respective guideways thereof, manually operable means selectively to control the direction in which power for moving said cradles is applied to the latter for thereby controlling the direction the said cradles are moved, means operable automatically to establish the limits to which said cradles are movable under the control of said manually operable means, and means to limit the power which may be applied to said cradles by the respective power means therefor so as to prevent damage to said power means upon accidental arrest of movement of the said cradles.

4. A movable mount as defined in claim 3 in which the means for limiting the power which may be applied to said cradles are clutches of the biased jaw tooth type so that audible warning of slipping will be given by the chattering of the slipping jaw teeth.

5. A movable mount comprising a plurality of cradles including an object supporting cradle, cooperating guideways and guide structure to support said cradles for relative movement effective reciprocably to move the supported object in a plurality of normally related directions, reversely operable means for moving said cradles in opposite directions upon the respective guideways therefor including separate reversely operable electric motors for moving each of said cradles, means for energizing said motors in reverse directions including a manually operable reversing switch for each motor selectively to control the direction of operation thereof, and cooperating switch means on said cradles and the respective guideways therefor operable automatically upon the arrival of said cradles at predetermined positions to inhibit movement of said cradles beyond the said positions.

6. A movable mount comprising a plurality of cradles including an object supporting cradle, cooperating guideways and guide structure to support said cradles for relative movement effective reciprocably to move the supported object vertically and in normal directions horizontally, reversely operable drive means individual to said cradles for moving the same in opposite directions upon the respective guideways thereof, and means for reversely driving said reversely operable drive means including separate reversible electric motors for driving each of the reversely operable drive means, clutches to limit the torque which may be applied by the said motors to the respective drive means operated thereby, manually operable reversing switches individual to the said motors selectively to control the direction of operation thereof, and cooperating switch means on said cradles and the respective guideways therefor operable automatically upon the arrival of said cradles at predetermined positions to inhibit movement of said cradles beyond said positions.

7. A movable mount comprising parallel horizontal tracks, a base support movable longitudinally of said tracks, parallel vertical tracks supported upon and movable with said base support, an intermediate support mounted for vertical movement relative to said vertical tracks, parallel horizontal tracks mounted on said intermediate support in planes normal to said first-mentioned horizontal tracks, said latter tracks being movable with the intermediate support, a platform support movable longitudinally of the horizontal tracks on said intermediate support, reversely operable means for moving said supports in opposite directions along their respective tracks, separate reversible drive motors operatively connected reversely to drive said reversely operable means respectively, means to control operation of said motors including circuits to control the direction of operation thereof, manually operable reversing switches in said circuits selectively to control energization of said circuits and thereby to control the direction of rotation of said motors, and limit switches in said circuits for automatically deenergizing the same upon the arrival of the said supports at one or the other of two opposed limits of movement upon the respective track structures therefor to prevent movement of the said supports beyond the said limits.

8. A movable mount comprising elongated horizontally extending track structure, a base support mounted upon and slidable longitudinally of said track structure, vertically extending track structure supported upon and movable with said base support, an intermediate support mounted for vertical reciprocation upon said vertically extending track structure, horizontally extending track structure supported upon and movable with said intermediate support, the last said track structure being normally disposed with respect to the axes of said base track structure, an object support on the track structure on said intermediate support slidably movable longitudinally thereof, reversely operable means including power means for driving said supports in opposite directions upon the respective track structures thereof to effect movement of an object on said object support vertically and in normal directions horizontally, manually operable means selectively to control the direction in which power for moving said supports is applied to the latter for thereby controlling the direction said supports are moved, means operable automatically to establish the limits to which said cradles are movable under the control of said manually operable means, and means for limiting the power which may be applied to said supports so as to prevent damage to said power means upon accidental arrest of said supports between their limits of movement.

9. A movable mount comprising parallel horizontal tracks, a base support mounted for sliding movement lengthwise of said tracks, parallel vertical tracks supported upon and movable with said base support, an intermediate support mounted for vertical movement relative to said vertical tracks, parallel horizontal tracks mounted on said intermediate support in planes normal to said first-mentioned horizontal tracks, said latter tracks being movable with the intermediate support, a platform support slidably movable longitudinally of the horizontal tracks on said intermediate support, feed screws rotatably mounted in parallel relation to each of said tracks respectively for moving said supports in opposite directions along their respective tracks, separate reversible drive motors operatively connected reversely to rotate each of said feed screws respectively, means to control operation of said motors including circuits to control the direction of operation thereof, manually operable reversing switches in the said circuits selectively to control energization of said circuits and thereby to control the direction of rotation of said motors, and automatically operable limit switches in said circuits for determining the limits to which said supports may be driven under the control of said manually operable reversing switches.

10. A movable mount comprising a plurality of relatively movable cradles including base, intermediate and object supporting cradles, track structure to support said cradles for relative movement effective reciprocably to move said object supporting cradle in normal directions horizontally and in a vertical direction including a pair of vertically extending tracks fixed to move with said base cradle and disposed in diagonally opposite positions relative to said intermediate cradle, means individual to said cradles for moving the same in opposite directions upon the respective track structures thereof including cradle moving means disposed at the diagonally opposite positions complementary to the position at which said vertical tracks are located, means for driving said cradle moving means including a single reversible motor intermediate said cradle moving means and a single drive chain driven by said motor and operatively connected to drive both of said diagonally opposite cradle moving means in unison in a like direction, manually operable control means selectively to effect operation of said motor in opposite directions thereby selectively to raise and lower said intermediate cradle, and automatically operable means to determine the limits to which said intermediate cradle may be driven under the control of said manually operable means.

11. A movable mount comprising a plurality of relatively movable cradles including base, intermediate and object supporting cradles, track structure to support said cradles for relative movement effective reciprocably to move said object supporting cradle in normal directions horizontally and in a vertical direction including a pair of vertically extending tracks fixed to move with said base cradle and disposed in diagonally opposite positions relative to said intermediate cradle, means individual to said cradles for moving the same in the directions in which they are movable including a pair of vertically extending feed screws disposed at the diagonally opposite positions complementary to the position at which said vertical tracks are located for vertically moving said intermediate cradle in response to rotary movement of said feed screws, means for driving said cradle moving means including duplicate pinions mounted in corresponding positions on said vertically extending feed screws, a drive chain looped around said duplicate pinions, a drive pinion for driving said chain in opposite directions simultaneously to rotate both feed screws in a like direction determined by the direction of rotation of said pinion for raising and lowering said intermediate cradle, a reversible motor for driving said drive pinion in opposite directions, and means to control operation of said motor including manually operable control means operable selectively to control the direction of operation of said motor and automatically operable means to determine the limits to which said intermediate cradle may be driven under the control of said manually operable means.

12. A movable mount comprising parallel horizontal tracks, a base support mounted for movement lengthwise of said tracks, rectangularly disposed vertically extending columns fixed to said base support, a pair of vertically extending tracks secured adjacent opposite ends thereof in said base support and a pair of diagonally opposite columns, an intermediate support mounted for vertical movement along said vertical tracks, parallel horizontal tracks fixedly mounted on said intermediate support in planes normal to said first-mentioned horizontal tracks, a platform support mounted for movement lengthwise of the horizontal tracks on said intermediate support, individual feed screws operatively connected to move said supports in opposite directions upon their respective tracks in response to opposite rotary movements of the said feed screws including a pair of vertically extending feed screws disposed at the diagonally opposite positions complementary to the diagonally opposite positions of said vertical tracks, means individual to said screws for rotating the same in opposite directions including a chain looped around duplicate pinions on said vertical feed screws, a drive pinion intermediate the two vertical feed screws engaged with both runs of said chain to drive said chain in opposite directions and thereby effect raising and lowering of the intermediate support, a reversible motor to drive said pinion in opposite directions, and means to control operation of said motor including manually operable means selectively to control the direction of operation of said motor and automatically operable means to determine the limits to which said supports may be driven under the control of said manually operable means.

13. A movable mount comprising a plurality of relatively movable cradles including generally rectangular-shaped first and second cradles, vertically extending track structure for the second cradle supported by the first at positions corresponding to the diagonally opposite corners of the second cradle, vertically disposed feed screws rotatably supported by the first cradle at positions corresponding to the diagonally opposite corners of the second cradle complementary to the corners at which the track structure is located, a feed nut fixed to the second cradle at each of the said complementary diagonally opposite corners and operatively engaged by the feed screws respectively so that reverse rotation of the latter raises and lowers the second cradle on said track structure, a single drive chain for rotatably driving said feed screws in synchronism, reversible drive means including an electric motor, means operatively to connect the motor and drive chain, manually operable control means selectively to effect operation of the drive means in opposite directions thereby selectively to raise and lower the second cradle, and automatically operable means to determine the limits to which the second cradle may be driven under the control of said manually operable control means.

14. A movable mount comprising a plurality of relatively movable cradles including generally rectangular-shaped first and second cradles, vertically extending track structure for the second cradle supported by the first at positions corresponding to the diagonally opposite corners of the second cradle, vertically disposed feed screws rotatably supported by the first cradle at positions corresponding to the diagonally opposite corners of the second cradle complementary to the corners at which the track structure is located, a feed nut fixed to the second cradle at each of the said complementary diagonally opposite corners and operatively engaged by the feed screws respectively so that reverse rotation of the latter raises and lowers the second cradle on said track structure, means for synchronously driving said feed screws in opposite directions to raise and lower the second cradle including an electric motor, manually operable control means selectively to effect operation of the drive means in opposite directions thereby selectively to raise and lower the second cradle, and automatically operable means to determine the limits to which the second cradle may be driven under the control of said manually operable control means.

15. A movable mount comprising a plurality of relatively movable cradles including generally rectangular-shaped first and second cradles, vertically extending track structure for the second cradle supported by the first at positions corresponding to the diagonally opposite corners of the second cradle, vertically oriented cooperating feed means on said first and second cradles at positions corresponding to the diagonally opposite corners of the second cradle complementary to the corners at which the track structure is located and each including a rotatable member and a fixed member, means for driving the rotatable members in synchronism including a reversible motor, means to control the operation of said motor including means selectively to control the direction of rotation thereof, and means automatically to determine the limits to which the second cradle may be driven under the control of said manually operable control means.

References Cited in the file of this patent

UNITED STATES PATENTS

| Number | Name | Date |
| --- | --- | --- |
| 961,607 | Granger | June 14, 1910 |
| 2,133,738 | Chaoul | Oct. 18, 1933 |
| 2,370,163 | Hare | Feb. 27, 1945 |
| 2,582,776 | Greenberg et al. | Jan. 15, 1952 |

FOREIGN PATENTS

| Number | Country | Date |
| --- | --- | --- |
| 535,984 | Germany | Oct. 17, 1931 |